United States Patent [19]

Tokida et al.

[11] Patent Number: 4,761,387

[45] Date of Patent: Aug. 2, 1988

[54] FLUORIDE GLASS

[75] Inventors: Minoru Tokida, Akishima; Tetsuro Izumitani, Hino; Toshiharu Yamashita, Hachioji; Kiyotaka Miura, Akishima, all of Japan

[73] Assignee: Hoya Corporation, Tokyo, Japan

[21] Appl. No.: 19,618

[22] Filed: Feb. 27, 1987

[30] Foreign Application Priority Data

Feb. 28, 1986 [JP] Japan .................................. 61-43065

[51] Int. Cl.⁴ .......................... C03C 3/32; C03C 4/10; C03C 13/04
[52] U.S. Cl. ...................................... 501/40; 501/37; 501/904
[58] Field of Search ................................... 501/40, 37

[56] References Cited

U.S. PATENT DOCUMENTS 4,308,066 12/1981 Mitachi et al. ........................ 501/37
4,346,176 8/1982 Kanamori et al. .................... 501/40

Primary Examiner—Mark L. Bell
Attorney, Agent, or Firm—Nixon & Vanderhye

[57] ABSTRACT

A fluoride glass comprising $AlF_3$, $ZrF_4$ and/or $HfF_4$, and at least one compound selected from $CaF_2$, $SrF_2$ and $BaF_2$, and a fluoride glass comprising these components and at least one additional component selected from $MgF_2$, $YF_3$, $NaF$ and other like compounds have the advantages that there hardly occurs crystallization in the production thereof, and that they are excellent in chemical durability, high in surface hardness, so that they can ideally serve as glass to be used for low loss optical fiber, infrared optical fiber for thermometer, infrared laser window, etc.

4 Claims, 1 Drawing Sheet

FLUORIDE GLASS

BACKGROUND OF THE INVENTION

1. Field of the Invention

This invention relates to a fluoride glass, which is suitably used as low loss optical fiber, infrared optical fiber for thermometer, infrared laser window, etc.

2. Description of the Prior Art

Infrared transmitting glass has a wide scope of use such as infrared optical fiber for thermometer, infrared laser window, low loss optical fiber, etc., so that efforts are being made for further development of such glass. As the infrared transmitting glass used for such purposes, there have been known $ZrF_4/BaF_2$-based fluoride glass and $AlF_3$-based fluoride glass as well as fluorophosphate glass.

Among said known types of infrared transmitting glasses, the $ZrF_4/BaF_2$-based fluoride glass has the disadvantage that it is low in hardness and liable to damage or scratch, so that when it is used for instance as low loss optical fiber, the fiber tends to be damaged and is subject to the risk of being broken at the damaged section. Further, this fluoride glass is poor in chemical durability, and it absorbs moisture from the atmosphere at normal temperature to produce OH bond which is a causative factor of infrared absorption, thus presenting the problem in reliability.

The $AlF_3$-based fluoride glass has the drawback that the composition has a high tendency for crystallization, so that the molten glass composition must be cooled rapidly to form the glass. It is also impossible to obtain large-sized glass, and thus the scope of use of this fluoride glass is limited.

The fluorophosphate glass has the problem that its light transmittability is limited to near infrared region (wavenumber to around 2400 $cm^{-1}$), and further it has infrared absorption at the wavenumber of around 3200 $cm^{-1}$ due to OH group that remains in the glass.

The primary object of this invention, therefore, is to provide a fluoride glass which has little likelihood of crystallization (or devitrification . . . hereinafter referred to as simply "crystallization") in the production thereof, and which also has excellent chemical durability and high surface hardness.

Another object of this invention is to provide a fluoride glass minimized in infrared absorption due to OH group.

Other objects of this invention will become apparent from the following description and the drawing.

SUMMARY OF THE INVENTION

Said objects of the invention can be achieved by providing fluoride glass of the present invention comprising $AlF_3$, $ZrF_4$ and/or $HfF_4$ and at least one compound selected from $CaF_2$, $SrF_2$ and $BaF_2$, the compositional ratios thereof in mol% being 20–45% of $AlF_3$, 0.5–25% of $ZrF_4$ and/or $HfF_4$, 0–42% of $CaF_2$, 0–25% of $SrF_2$ and 0–25% of $BaF_2$, the total content of $CaF_2$, $SrF_2$ and $BaF_2$ being 20–70% (hereinafter referred to as fluoride glass of the first invention).

Said objects of the invention can be also attained by providing another fluoride glass of the present invention comprising $AlF_3$, $ZrF_4$ and/or $HfF_4$, at least one compound selected from $CaF_2$, $SrF_2$ and $BaF_2$, and at least one additional component selected from $MgF_2$, $YF_3$ and/or fluorides of lanthanoids, $ZnF_2$, $CdF_2$, $InF_3$, $GaF_3$, $PbF_2$ and fluorides of alkalimetals, the compositional ratios thereof in mol% being 20–45% of $AlF_3$, 0.5–25% of $ZrF_4$ and/or $HfF_4$, 0–42% of $CaF_2$, 0–25% of $SrF_2$, 0–25% of $BaF_2$, the total content of $CaF_2$, $SrF_2$ and $BaF_2$ being 20–70%, 0–15% of $MgF_2$, 0–25% of $YF_3$ and/or fluorides of lanthanoids, 0–20% of $ZnF_2$, 0–20% of $CdF_2$, 0–10% of $InF_3$, 0–10% of $GaF_3$, 0–25% of $PbF_2$ and 0–20% of fluorides of alkali metals, the total content of said additional components being 1–55% (hereinafter referred to as fluoride glass of the second invention).

DETAILED DESCRIPTION OF THE INVENTION

Figure 1:
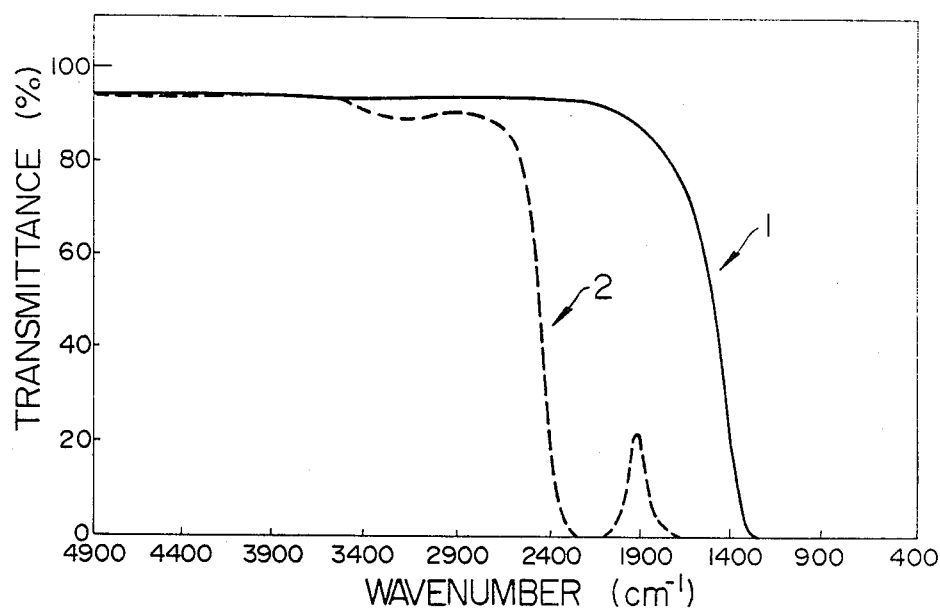
FIG. 1 shows the spectral transmittance curves in the infrared region of the fluoride glass of Example 1 according to this invention, indicated by 1, and a conventional fluorophosphate glass FCD-10 (reference number of optical glass made by HOYA CORPORATION), indicated by 2, as measured through 5 mm thickness of each glass.

The fluoride glass of the first invention, as described above, comprises $AlF_3$, $ZrF_4$ and/or $HfF_4$ and at least one compound selected from $CaF_2$, $SrF_2$ and $BaF_2$. Because of its multiple fluoride components, the composition of this fluoride glass is stable against crystallization and easy to vitrify and also has high chemical durability. Further, $AlF_3$ contributes to the enhancement of surface hardness of the glass.

The definitions of the compositional ratios of the respective components shown above are based on the following reasons.

Regarding $AlF_3$, its content in the present fluoride glass is specified to be 20 to 45% by mole. If its content is less than 20% or exceeds 45% by mole, the composition becomes liable to crystallization, making it difficult to obtain stabilized glass. Also, in case the $AlF_3$ content is less than 20%, it is unable to enhance the surface hardness of the glass. The preferred content of $AlF_3$ is 26 to 40% by mole.

The specified content of $ZrF_4$ and/or $HfF_4$ in the present fluoride glass is 0.5 to 25% by mole. If its (their) content is less than 0.5% or greater than 25%, the composition also becomes prone to crystallization and it becomes difficult to obtain stabilized glass. The preferred content of $ZrF_4$ and/or $HfF_4$ is 3 to 20%.

The specified contents of $CaF_2$, $SrF_2$ and $BaF_2$ in the present fluoride glass are 0 to 42%, 0 to 25% and 0 to 25% by mole, respectively, the total content of $CaF_2$, $SrF_2$ and $BaF_2$ being defined to be 20 to 70%. If each of them is not included in the above specified range, there again arises the problem of easy crystallization of the composition, which makes it difficult to obtain stabilized glass. The preferred contents of $CaF_2$, $SrF_2$ and $BaF_2$ are 10 to 38%, 3 to 20% and 3 to 22%, respectively, the preferred total content of $CaF_2$, $SrF_2$ and $BaF_2$ being 20 to 60% by mole.

As for the fluoride glass of the second invention, it contains all of the essential components of the fluoride glass of the first invention in the same compositional ratios, and therefore it retains all of said merits (easiness of vitrification, excellent chemical durability and high surface hardness) of the fluoride glass of the first invention.

The fluoride glass of the second invention contains, in addition to said essential components of the fluoride glass of the first invention, at least one additional components selected from $MgF_2$, $YF_3$ and/or fluorides of lanthanoids, $ZnF_2$, $CdF_2$, $InF_3$, $GaF_3$, $PbF_2$ and fluorides of alkali metals. Each of these additional components, excepting fluorides of alkali metals, proves helpful to make up for the deficiency of the network structure of the fluoride glass and also strengthens the effect of preventing crystallization and improving chemical durability. The fluorides of alkali metals serve for lowering the viscosity of the composition while also lowering the melting temperature and softening temperature of the composition.

Said lanthanoids include La, Ce, Pr, Nd, Pm, Sm, Eu, Gd, Tb, Dy, Ho, Er, Tm, Yb and Lu, among which La and Gd are most advantageous in infrared transmittability. Said alkali metals include Li, Na, K, Rb and Cs.

The specified selection of the contents of these additional components is based on the following reasons.

As stated before, the defined content in mol% of $MgF_2$ is 0 to 15%, that of $YF_3$ and/or fluorides of lanthanoids is 0 to 25%, that of $ZnF_2$ is 0 to 20%, that of $CdF_2$ is 0 to 20%, that of $InF_3$ is 0 to 10%, that of $GaF_3$ is 0 to 10%, and that of $PbF_2$ is 0 to 25%. If the contents of these components exceed the defined upper limit values, the composition becomes liable to crystallization, making it difficult to obtain stabilized glass. The content of the fluorides of alkali metals, another additional component, is defined to be 0 to 20% by mole. A higher content thereof worsens the chemical durability of the glass. As described above, the fluoride glass of the second invention contains at least one of said additional components, and the total content thereof is defined to be 1 to 55% by mole. Within this range, the crystallization is further prevented to obtain stabilized glass and the chemical durability is further improved.

The preferred contents (mol%) of these additional components are: 0 to 10% of $MgF_2$, 0 to 15% of $YF_3$ and/or fluorides of lanthanoids, 0 to 15% of $ZnF_2$, 0 to 15% of $CdF_2$, 0 to 8% of $InF_3$, 0 to 8% of $GaF_3$, 0 to 20% of $PbF_2$ and 0 to 15% of fluorides of alkali metals. The preferred total content of these additional components is 2.5 to 45%.

The present invention will be further described below by showing the examples thereof, which examples however are merely intended to be illustrative and not limiting the scope of the invention.

EXAMPLE 1

(Fluoride glass of the second invention)

Used as starting materials were $AlF_3$, $ZrF_4$, $CaF_2$, $SrF_2$, $BaF_2$, $MgF_2$, $YF_3$ and NaF. 100 g in total of these materials was weighed out so that the finally obtained fluoride glass composition would be 34.09 mol% $AlF_3$, 7.11 mol% $ZrF_4$, 23.09 mol% $CaF_2$, 14.96 mol% $SrF_2$, 10.32 mol% $BaF_2$, 4.02 mol% $MgF_2$, 3.73 mol% $YF_3$ and 2.68 mol% NaF (as shown in Table 2), and they were mixed in an agate mortar. The mixed powder was put into a gold crucible and this gold crucible was placed in an electric furnace having a temperature of about 900° C. and an argon gas atmosphere for melting the mixture therein for 1.5 hours. The resulting molten glass was cast into a bottomed mold measuring 5 cm long by 5 cm wide by 1 cm high and then cooled slowly by placing the mold in an annealing furnace of about 410° C. to obtain a square plate-like glass.

The obtained fluoride glass was colorless and transparent. This fluoride glass was polished at its two opposite faces and checked for the presence of crystals with the naked eye. No crystals were observed on the four non-polished faces and in the inside of the glass. Further, when He-Ne laser beams were applied to this fluoride glass via the polished faces to see the beam path due to scattering of light, no beam path was sighted, which confirmed the absence of crystals.

As a comparative experiment, a known type of $AlF_3$-based fluoride glass (40 mol% $AlF_3$, 22 mol% $CaF_2$, 22 mol% $BaF_2$ and 16 mol% $YF_3$) was produced in the same way as Example 1 and similar observation was made on this glass. The presence of crystals in this fluoride glass could be discerned even by the naked eye.

The properties of the fluoride glass of Example 1 and those of a conventional $ZrF_4/BaF_2$-based fluoride glass (53 mol% $ZrF_4$, 20 mol% $BaF_2$, 3 mol% $AlF_3$, 4 mol% $LaF_3$ and 20 mol% NaF), made for the sake of comparison by the same method as Example 1, were determined according to Japanese Optical Glass Industrial Standards, JOGIS-1975. The results are shown in Table 1. As seen from Table 1, the fluoride glass of Example 1 showed a weight loss % in water durability by the powdered-glass method (Dw) of only 0.16 wt%, far less than that (26.31 wt%) of the conventional $ZrF_4/BaF_2$-based fluoride glass. Also, the weight loss % in acid durability by the powdered-glass method (Da) of the former was only 0.68 wt%, strikingly low in comparison with 27.09 wt% of the latter. These indicate the drastic improvement in chemical durability of the fluoride glass of Example 1 in comparison with the conventional $ZrF_4/BaF_2$-based fluoride glass. Further, the Knoop hardness (HK) of the former is 340 kg/mm² while that of the latter is 220 kg/mm². Thus, the fluoride glass of Example 1 is higher in hardness and more proof against damage or scratch than said conventional fluoride glass. This indicates the higher effect of the fluoride glass of Example 1 in reducing the risk of fiber break due to damage or scratch when used as low loss optical fiber.

FIG. 1 shows the spectral transmittance curves in the infrared region (wavenumber: 4900–400 cm$^{-1}$) of the fluoride glass of Example 1 and a conventional fluorophosphate glass FCD-10 (reference number of optical glass produced by HOYA CORPORATION) as measured along 5 mm thickness of each glass. In the graph, 1 shows the spectral transmittance curve of the fluoride glass of Example 1 and 2 shows that of FCD-10. It is seen that the fluoride glass of Example 1 retain 90% spectral transmittance through the infrared region down to the wavenumber of close to 2000 cm$^{-1}$ while FCD-10 retains 90% spectral transmittance in the region not beyond the wavenumber of around 2800 cm$^{-1}$ and also has infrared absorption due to OH group at around 3200 cm$^{-1}$. From this it is evident that the fluoride glass of Example 1 has no OH group which is detrimental to infrared transmission and that it allows transmission of infrared rays of longer wavelength than possible with FCD-10, thus expanding the available infrared region.

EXAMPLE 2

(Fluoride glass of the second invention)

The same starting materials as used in Example 1 were used except for the replacement of $ZrF_4$ with $HfF_4$, and the materials were weighed out to be 100 g in total so that the finally obtained fluoride glass composition would be 34.09 mol% $AlF_3$, 7.11 mol% $HfF_4$, 23.09 mol% $CaF_2$, 14.96 mol% $SrF_2$, 10.32 mol% $BaF_2$, 4.02 mol% $MgF_2$, 3.73 mol% $YF_3$ and 2.68 mol% NaF (as shown in Table 2), and otherwise the same procedure as Example 1 was followed to obtain a square plate-like colorless transparent glass.

The obtained fluoride glass was observed with the naked eye in the same way as Example 1, finding no crystals in the glass. Also, irradiation of the glass with He-Ne laser beams revealed no beam path due to scattering of light, which confirmed the absence of crystals.

The properties of the fluoride glass of Example 2 determined in the same way as Example 1 are shown in Table 1. It is seen from Table 1 that similarly to that of Example 1, the fluoride glass of Example 2 has better quality in terms of water durability by the powdered-glass method (Dw), acid durability by the powdered-glass method (Da) and Knoop hardness (Hk) than the conventional $ZrF_4/BaF_2$-based fluoride glass.

The measurement of spectral transmittance of this fluoride glass in the infrared region (wavenumber: 4900–400 $cm^{-1}$), made in the same way as Example 1, gave a spectral transmittance curve similar to that of Example 1 although not shown here.

EXAMPLE 3

(Fluoride glass of the second invention)

The materials of Example 1 plus $PbF_2$ were used as starting materials, and they were weighed out to make a total amount of 100 g so that the finally obtained fluoride glass composition would be 34.09 mol% $AlF_3$, 7.11 mol% $ZrF_4$, 3.09 mol% $CaF_2$, 10.96 mol% $SrF_2$, 20.32 mol% $BaF_2$, 4.02 mol% $MgF_2$, 3.73 mol% $YF_3$, 14.00 mol% $PbF_2$ and 2.68 mol% NaF (as shown in Table 2). The materials were treated according to the same process as Example 1 to obtain a square plate-like colorless transparent glass.

The obtained fluoride glass was observed with the naked eye after the manner of Example 1, but no crystals were detected. Also, when it was irradiated with He-Ne laser beams, there was seen no beam path due to scattering of light. It was thus confirmed that no crystals existed in the glass.

The properties of the fluoride glass of Example 3 determined in the same way as Example 1 are shown in Table 1. Table 1 confirms the excellence of the fluoride glass of Example 3 over the conventional $ZrF_4/BaF_2$-based fluoride glass in water durability by the powdered-glass method (Dw), acid durability by the powdered-glass method (Da) and Knoop hardness (Hk). Spectral transmittance of this fluoride glass in the infrared region (wavenumber: 4900–400 $cm^{-1}$) was measured in the same way as Example 1 to obtain a spectral transmittance curve, not shown, similar to that of Example 1.

TABLE 1

| Properties | Symbol | Example 1 | Example 2 | Example 3 | Prior art $ZrF_4/BaF_2$-based |
| --- | --- | --- | --- | --- | --- |
| Refractive index | $\eta d$ | 1.42913 | 1.4250 | 1.43216 | 1.49897 |
| Abbe-Number | $\nu d$ | 96.39 | 96.12 | 95.33 | 75.95 |
| Transition point | $T_g$ (°C.) | 398 | 402 | 395 | 257 |
| Sag point | $T_s$ (°C.) | 423 | 429 | 419 | 277 |
| Coefficient of linear thermal expansion | $\alpha$ 100~200° C. ($10^{-7}$/° C.) | 178 | 177 | 180 | 204 |
| | $\alpha$ 100~300° C. ($10^{-7}$/° C.) | 183 | 181 | 185 | |
| Weight loss in water durability | $D_w$ (wt %) | 0.16 | 0.15 | 0.16 | 26.31 |
| Weight loss in acid durability | $D_a$ (wt %) | 0.68 | 0.69 | 0.70 | 27.09 |
| Specific gravity | S. G. | 3.76 | 3.79 | 3.83 | 4.33 |
| Knoop hardness | Hk (kg/mm$^2$) | 340 | 340 | 335 | 220 |

Measured according to Japanese Optical Glass Industrial Standards, JOGIS-1975.

EXAMPLES 4–38

(Fluoride glass of the second invention)

& EXAMPLES 39–40

(Fluoride glass of the first invention)

Square plate-like colorless transparent glass samples having the fluoride components shown in Table 2, Examples 4–40 columns were obtained according to the process of Example 1.

The obtained fluoride glass samples of Examples 4–40 were observed with the naked eye and irradiated with He-Ne laser beams in the same ways as in Example 1. As a result, there were detected no crystals nor any beam path in any of these fluoride glass samples, indicating that they were all stable against crystallization.

TABLE 2

| Components | Example 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| $AlF_3$ | 34.09 | 34.09 | 34.09 | 22.09 | 22.09 | 34.09 | 34.09 | 34.09 | 34.09 | 34.09 | 34.09 | 34.09 | 29.09 |
| $ZrF_4$ | 7.11 | | 7.11 | 1.11 | 19.11 | 7.11 | 2.11 | 7.11 | 7.11 | 7.11 | 7.11 | 7.11 | 7.11 |
| $HfF_4$ | | 7.11 | | 18.00 | | | 5.00 | | | | | | |
| (A) | 7.11 | 7.11 | 7.11 | 19.11 | 19.11 | 7.11 | 7.11 | 7.11 | 7.11 | 7.11 | 7.11 | 7.11 | 7.11 |
| $CaF_2$ | 23.09 | 23.09 | 3.09 | 23.09 | 23.09 | 17.19 | 23.09 | 23.09 | 23.09 | 23.09 | 23.09 | 16.48 | 23.09 |
| $SrF_2$ | 14.96 | 14.96 | 10.96 | 14.96 | 14.96 | 11.13 | 14.96 | 14.96 | 14.96 | 14.96 | 14.96 | 10.68 | 14.96 |
| $BaF_2$ | 10.32 | 10.32 | 20.32 | 10.32 | 10.32 | 7.68 | 10.32 | 10.32 | 10.32 | 10.32 | 14.34 | 7.36 | 10.32 |
| (B) | 48.37 | 48.37 | 34.37 | 48.37 | 48.37 | 36.00 | 48.37 | 48.37 | 48.37 | 48.37 | 52.39 | 34.52 | 48.37 |

TABLE 2-continued

| Components | | | | | | | | | | | | | |
|---|---|---|---|---|---|---|---|---|---|---|---|---|
| MgF$_2$ | 4.02 | 4.02 | 4.02 | 4.02 | 4.02 | 2.99 | 4.02 | 4.02 | 4.02 | 4.02 | | 2.87 | 4.02 |
| YF$_3$ | 3.73 | 3.73 | 3.73 | 2.57 | 2.57 | 2.57 | 3.73 | | 3.73 | 3.73 | 3.73 | 3.73 | 3.73 |
| LaF$_3$ | | | | 1.16 | 1.16 | 1.16 | | | | | | | |
| GdF$_3$ | | | | | | | | 3.73 | | | | | |
| ZnF$_2$ | | | | | | | | | | | | | |
| CdF$_2$ | | | | | | | | | | | | | |
| InF$_3$ | | | | | | | | | | | | | 5.00 |
| GaF$_3$ | | | | | | | | | | | | | |
| PbF$_2$ | | 14.00 | | | | | | | | | | 15.00 | |
| LiF | | | | | | | | | 2.68 | | | | |
| NaF | 2.68 | 2.68 | 2.68 | 2.68 | 2.68 | 16.08 | 2.68 | 2.68 | | | 2.68 | 2.68 | 2.68 |
| KF | | | | | | | | | | | | | |
| CsF | | | | | | | | | | 2.68 | | | |
| (C) | 10.43 | 10.43 | 24.43 | 10.43 | 10.43 | 22.80 | 10.43 | 10.43 | 10.43 | 10.43 | 6.41 | 24.28 | 15.43 |

| Components | Example | | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 | 26 |
| AlF$_3$ | 34.09 | 34.09 | 32.98 | 20.08 | 29.09 | 29.09 | 34.09 | 34.09 | 29.09 | 29.09 | 29.09 | 29.09 | 25.59 |
| ZrF$_4$ | 7.11 | 7.11 | 1.11 | | 4.02 | 7.11 | 7.11 | 7.11 | 4.02 | 4.02 | 4.02 | 4.02 | 24.61 |
| HfF$_4$ | | | | 20.00 | | | | | | | | | |
| (A) | 7.11 | 7.11 | 1.11 | 20.00 | 4.02 | 7.11 | 7.11 | 7.11 | 4.02 | 4.02 | 4.02 | 4.02 | 24.61 |
| CaF$_2$ | 23.09 | 24.72 | 23.09 | 20.11 | 20.11 | 20.09 | 33.09 | 38.05 | 24.96 | 9.00 | 24.96 | 24.96 | 10.33 |
| SrF$_2$ | 14.96 | 15.73 | 14.96 | 13.03 | 13.03 | 17.96 | 4.96 | | | | | | 15.94 |
| BaF$_2$ | | 10.60 | 10.32 | 11.57 | 11.57 | 10.32 | 10.32 | 10.32 | 10.32 | 11.32 | 10.32 | 11.52 | 13.31 |
| (B) | 38.05 | 51.05 | 48.37 | 44.71 | 44.71 | 48.37 | 48.37 | 48.37 | 35.28 | 20.32 | 35.28 | 36.48 | 39.58 |
| MgF$_2$ | 4.02 | 4.02 | 4.02 | 3.50 | 3.50 | 9.02 | 4.02 | 4.02 | 6.18 | 6.18 | 6.18 | 14.98 | 2.77 |
| YF$_3$ | 3.73 | 2.57 | 10.84 | 2.24 | 13.76 | 3.73 | 3.73 | 3.73 | 3.73 | 3.73 | 3.73 | 3.73 | 1.77 |
| LaF$_3$ | | 1.16 | | 1.52 | | | | | | | 15.00 | | 2.04 |
| GdF$_3$ | | | | | | | | | 15.00 | | | | |
| ZnF$_2$ | 13.00 | | | | | | | | | | | 4.02 | 4.02 |
| CdF$_2$ | | | | | | | | | | | 15.00 | | |
| InF$_3$ | | | | | | | | | | | | | |
| GaF$_3$ | | | | | | | | | | | | 5.00 | |
| PbF$_2$ | | | | | | | | | | 19.98 | | | |
| NaF | | | 2.68 | 4.92 | 4.92 | 2.68 | 2.68 | 2.68 | 2.68 | 1.68 | 2.68 | 2.68 | 3.64 |
| KF | | | | | | | | | | 4.02 | | | |
| CsF | | | | 3.03 | | | | | | | | | |
| (C) | 20.75 | 7.75 | 17.54 | 15.21 | 22.18 | 15.43 | 10.43 | 10.43 | 31.61 | 46.57 | 31.61 | 30.41 | 10.22 |

| Components | Example | | | | | | | | | | | | |
|---|---|---|---|---|---|---|---|---|---|---|---|---|
| | 27 | 28 | 29 | 30 | 31 | 32 | 33 | 34 | 35 | 36 | 37 | 38 | 39 | 40 |
| AlF$_3$ | 39.09 | 44.09 | 26.09 | 20.08 | 29.09 | 34.09 | 29.09 | 34.09 | 37.82 | 37.82 | 21.59 | 26.09 | 37.82 | 37.82 |
| ZrF$_4$ | 10.66 | | | 7.11 | 7.11 | 7.11 | 4.02 | 7.11 | 10.00 | 10.00 | 4.02 | 4.02 | 11.13 | |
| HfF$_4$ | | 3.11 | 24.11 | | | | | | | | | | | 11.13 |
| (A) | 10.66 | 3.11 | 24.11 | 7.11 | 7.11 | 7.11 | 4.02 | 7.11 | 10.00 | 10.00 | 4.02 | 4.02 | 11.13 | 11.13 |
| CaF$_2$ | 18.98 | 18.45 | 15.94 | 32.58 | 27.92 | | 41.96 | 23.09 | 23.09 | 23.09 | 9.00 | 14.96 | 23.09 | 23.09 |
| SrF$_2$ | 12.30 | 11.95 | 10.33 | 21.10 | 18.09 | 24.18 | 11.32 | 3.46 | 14.96 | 14.96 | | | 14.96 | 14.96 |
| BaF$_2$ | 10.30 | 8.79 | 13.31 | 16.30 | 13.98 | 24.19 | 3.18 | 21.82 | 13.00 | 11.50 | 11.32 | 10.32 | 13.00 | 13.00 |
| (B) | 41.58 | 39.19 | 39.58 | 69.98 | 59.99 | 48.37 | 56.46 | 48.37 | 51.05 | 49.55 | 20.32 | 25.28 | 51.05 | 51.05 |
| MgF$_2$ | 3.30 | 7.21 | 2.77 | | 0.98 | 4.02 | 4.02 | 4.02 | | 1.50 | 13.68 | 9.18 | | |
| YF$_3$ | 1.35 | 3.27 | 1.77 | 2.83 | 2.83 | 3.73 | 3.73 | 3.73 | 1.13 | 1.13 | 3.73 | 13.73 | | |
| LaF$_3$ | | 0.45 | 2.04 | | | | | | | | 15.00 | | | |
| GdF$_3$ | | | | | | | | | | | | | | |
| ZnF$_2$ | | | | | | | | | | | | 4.02 | | |
| CdF$_2$ | | | | | | | | | | | | 15.00 | | |
| InF$_3$ | | | | | | | | | | | | | | |
| GaF$_3$ | | | | | | | | | | | | | | |
| PbF$_2$ | | | | | | | | | | | 19.98 | | | |
| NaF | 4.02 | 2.68 | 3.64 | | | 2.68 | 2.68 | 2.68 | | | 1.68 | 2.68 | | |
| KF | | | | | | | | | | | | | | |
| CsF | | | | | | | | | | | | | | |
| (C) | 8.67 | 13.61 | 10.22 | 2.83 | 3.81 | 10.43 | 10.43 | 10.43 | 1.13 | 2.63 | 54.07 | 44.61 | 0 | 0 |

(Figures are mol %)
(A) = ZrF$_4$ and/or HfF$_4$,
(B) = total of CaF$_2$, SrF$_2$ and BaF$_2$,
(C) = total of 13 components from MgF$_2$ to CsF.

As apparent from the foregoing examples, the fluoride glass according to this invention has the composition which is resistant to crystallization in the production of the glass and makes it possible to obtain large-sized glass with no need of using any specific cooling means. Also, the fluoride glass of this invention has remarkably high chemical durability and little risk of incurring quality deterioration in use. Further, it has high surface hardness and is highly proof against damage or scratch. Therefore the fluoride glass according to this invention is highly suited for use as glass applicable for low loss optical fiber, infrared optical fiber for thermometer, infrared laser window, etc.

The invention is not limited to the specific embodiments described above but of course includes various modification within the scope of the appended claims.

What is claimed is:

1. A fluoride glass consisting essentially of AlF$_3$, ZrF$_4$ and/or HfF$_4$, and at least one compound selected from the group consisting of CaF$_2$, SrF$_2$ and BaF$_2$, the compositional ratios of said components in mol% being 20–45% of AlF$_3$, 0.5–25% of ZrF$_4$ and/or HfF$_4$, 0–42% of $CaF_2$, 0–25% of $SrF_2$ and 0–25% of $BaF_2$, the total content of $CaF_2$, $SrF_2$ and $BaF_2$ being 20–70%.

2. A fluoride glass according to claim 1, wherein the compositional ratios of the components in mol% are 26–40% of $AlF_3$, 3–20% of $ZrF_4$ and/or $HfF_4$, 10–38% of $CaF_2$, 3–20% of $SrF_2$ and 3–22% of $BaF_2$, the total content of $CaF_2$, $SrF_2$ and $BaF_2$ being 20–60%.

3. A fluoride glass consisting essentially of $AlF_3$, $ZrF_4$ and/or $HfF_4$, at least one compound selected from the group consisting of $CaF_2$, $SrF_2$ and $BaF_2$, and at least one additional component selected from the group consisting of $MgF_2$, $YF_3$ and/or fluorides of lanthanoids, $ZnF_2$, $CdF_2$, $InF_3$, $GaF_3$, $PbF_2$ and fluorides of alkali metals, the compositional ratios of said components in mol% being 20–45% of $AlF_3$, 0.5–25% of $ZrF_4$ and/or $HfF_4$, 0–42% of $CaF_2$, $SrF_2$ and $BaF_2$ being 20–70%, 0–15% of $MgF_2$, 0–25% of $YF_3$ and/or fluorides of lanthanoids, 0–20% of $ZnF_2$, 0–20% of $CdF_2$, 0–10% of $InF_3$, 0–10% of $GaF_3$, 0–25% of $PbF_2$ and 0–20% of fluorides of alkali metals, the total content of said additional components being 1–55%.

4. A fluoride glass according to claim 3, wherein the compositional ratios of the components in mol% are 26–40% of $AlF_3$, 3–20% of $ZrF_4$ and/or $HfF_4$, 10–38% of $CaF_2$, 3–20% of $SrF_2$, 3–22% of $BaF_2$, the total content of $CaF_2$, $SrF_2$ and $BaF_2$ being 20–60%, 0–10% of $MgF_2$, 0–15% of $YF_3$ and/or fluorides of lanthanoids, 0–15% of $ZnF_2$, 0–15% of $CdF_2$, 0–8% of $InF_3$, 0–8% of $GaF_3$, 0–20% of $PbF_2$ and 0–15% of fluorides of alkali metals, the total content of said additional components being 2.5–45%.

* * * * *